US012572432B2

(12) United States Patent
Suzuki et al.

(10) Patent No.: US 12,572,432 B2
(45) Date of Patent: Mar. 10, 2026

(54) CLUSTER REDUNDANCY METHOD WHEN USING LOW RELIABILITY NODES

(71) Applicant: HITACHI, Ltd., Tokyo (JP)

(72) Inventors: Takanobu Suzuki, San Jose, CA (US); Hiroyuki Osaki, Los Gatos, CA (US)

(73) Assignee: HITACHI VANTARA, LTD., Yokohama (JP)

( * ) Notice: Subject to any disclaimer, the term of this patent is extended or adjusted under 35 U.S.C. 154(b) by 27 days.

(21) Appl. No.: 18/639,147

(22) Filed: Apr. 18, 2024

(65) Prior Publication Data

US 2025/0328434 A1 Oct. 23, 2025

(51) Int. Cl.
*G06F 11/16* (2006.01)
*G06F 11/07* (2006.01)
(52) U.S. Cl.
CPC ........ *G06F 11/1666* (2013.01); *G06F 11/076* (2013.01); *G06F 11/0772* (2013.01)
(58) Field of Classification Search
CPC . G06F 11/1666; G06F 11/076; G06F 11/0772
USPC ....................................... 714/6.32
See application file for complete search history.

(56) References Cited

U.S. PATENT DOCUMENTS

| 10,621,060 | B2 | 4/2020 | Agetsuma et al. | |
| 11,360,854 | B2 * | 6/2022 | Zhou | G06F 11/0709 |
| 2021/0019194 | A1 * | 1/2021 | Bahl | H04L 67/1031 |
| 2021/0334043 | A1 | 10/2021 | Ito et al. | |

* cited by examiner

*Primary Examiner* — Yair Leibovich
(74) *Attorney, Agent, or Firm* — PROCOPIO, CORY, HARGREAVES & SAVITCH LLP

(57) ABSTRACT

Management of storage clusters involving high reliability and low reliability nodes, wherein active and standby pairs are chained across the high reliability and low reliability nodes such that each of the high reliability and low reliability nodes involve volumes of the active and standby pairs, including, for receipt of a request for volume creation with a specified volume application, selecting a storage cluster from the storage clusters to create the volume with the specified volume application based on policy of the volume and existence of spot instances in the storage clusters, the determining involving, for the policy of the volume indicative of a development volume, selecting the storage cluster having one or more spot instances from the storage clusters; and for the policy of the volume indicative of a production volume, selecting the storage cluster having no spot instances from the storage clusters.

15 Claims, 13 Drawing Sheets

Service Catalogue

Service Catalogue 200-2

| Service Name 200-2-1 | Unit Price [USD/day] 200-2-2 | Unit Capacity [GB] 200-2-3 | Max RD Throughput 200-2-4 | Max WR Throughput 200-2-5 | Min RD Throughput 200-2-6 | Min WR Throughput 200-2-7 | Volume use 200-2-8 | Volume type 200-2-9 |
|---|---|---|---|---|---|---|---|---|
| Development-capacity | 0.1 | 100GB | 100MB/s | 100MB/s | 10MB/s | 10MB/s | Development | Capacity |
| Production-capacity | 0.3 | 100GB | 100MB/s | 100MB/s | 10MB/s | 10MB/s | Production | Capacity |
| Development-performance | 0.2 | 100GB | 200MB/s | 200MB/s | 50MB/s | 50MB/s | Development | Performance |
| Production-performance | 0.6 | 100GB | 200MB/s | 200MB/s | 50MB/s | 50MB/s | Production | Performance |

Cancel    Apply

FIG. 4

Storage Cluster Management table 200-3

| ID 200-3-1 | Cluster Name 200-3-2 | Number of on-demand nodes 200-3-3 | Number of spot nodes 200-3-4 | Metadata redundancy 200-3-5 | Data redundancy type 200-3-6 | Data redundancy 200-3-7 | Num of Data 200-3-8 | Used Capacity/Total Capacity 200-3-9 | Cluster address 200-3-10 |
|---|---|---|---|---|---|---|---|---|---|
| 0 | Development-0 | 2 | 2 | 2 | Mirror | 2 | - | 0GB/2000GB | zzz.zzz.zzz.1 |
| 1 | Production-0 | 4 | 0 | 2 | 4D+2P | 2 | 4 | 0GB/2000GB | zzz.zzz.zzz.2 |

FIG. 6

Storage Node Management table 200-4

| ID 200-4-1 | Node Name 200-4-2 | Node Address 200-4-3 | Instance Type 200-4-4 | Used Capacity/Total Capacity 200-4-5 | Cluster ID 200-4-6 | Status 200-4-7 |
|---|---|---|---|---|---|---|
| 0 | Dev0-0 | xxx.xxx.xxx.1 | On-demand | 0GB/500GB | 0 | Running |
| 1 | Dev0-1 | xxx.xxx.xxx.2 | Spot | 0GB/500GB | 0 | Running |
| 2 | Dev0-2 | xxx.xxx.xxx.3 | On-demand | 0GB/500GB | 0 | Running |
| 3 | Dev0-3 | xxx.xxx.xxx.4 | Spot | 0GB/500GB | 0 | Running |
| 4 | Prod0-0 | yyy.yyy.yyy.1 | On-demand | 0GB/500GB | 1 | Running |
| 5 | Prod0-1 | yyy.yyy.yyy.2 | On-demand | 0GB/500GB | 1 | Running |
| 6 | Prod0-2 | yyy.yyy.yyy.3 | On-demand | 0GB/500GB | 1 | Running |
| 7 | Prod0-3 | yyy.yyy.yyy.4 | On-demand | 0GB/500GB | 1 | Running |

FIG. 7

Volume management table 200-5

| Cluster ID 200-5-1 | Volume ID 200-5-2 | Volume Name 200-5-3 | Volume Type 200-5-4 | Used Capacity/Total Capacity 200-5-5 | Node ID 200-5-6 |
|---|---|---|---|---|---|
| 0 | 0 | Dev-0 | Development | 0GB/100GB | 0 |
| 0 | 1 | Dev-0 | Development | 0GB/100GB | 1 |
| 1 | 0 | Prd-0 | Production | 0GB/100GB | 0 |

FIG. 8

Group management table 200-6

| Cluster ID 200-6-1 | Group ID 200-6-2 | Active node ID 200-6-3 | Stand-by node ID 200-6-4 | Metadata Redundancy 200-6-5 | Data Redundancy destination node ID 200-6-6 |
|---|---|---|---|---|---|
| 0 | 0 | 0 | 1 | 2 | 1 |
| 0 | 1 | 1 | 2 | 2 | 2 |
| 0 | 2 | 2 | 3 | 2 | 3 |
| 0 | 3 | 3 | 0 | 2 | 0 |

FIG. 9

Volume type and storage cluster template table 200-7

| ID 200-7-1 | Acceptable Volume Type 200-7-2 | Metadata redundancy 200-7-3 | Data redundancy type 200-7-4 | Data redundancy 200-7-5 | Num of Data 200-7-6 | Default total number of nodes 200-7-7 |
|---|---|---|---|---|---|---|
| 0 | Performance | 2 | Mirror | 2 | - | 4 |
| 1 | Capacity | 2 | 4D+2P | 2 | 4 | 6 |

FIG. 10

Node management table 100-4-1 (Included in Cluster configuration 100-4)

| Cluster ID 100-4-1-1 | Node ID 100-4-1-2 | Node name 100-4-1-3 | Node IP Address 100-4-1-4 | Node Type 100-4-1-5 | Used Capacity/ Total Capacity 100-4-1-6 | Node Status 100-4-1-7 | Volumes 100-4-1-8 |
|---|---|---|---|---|---|---|---|
| 0 | 0 | Dev0-0 | xx.xxx.xxx. 1 | On-demand | 0GB/500GB | Active | 0, 4, 8, ... |
| 0 | 1 | Dev0-1 | xx.xxx.xxx. 2 | Spot | 0GB/500GB | Active | 1, 5 9, ... |
| 0 | 2 | Dev0-2 | xx.xxx.xxx. 3 | On-demand | 0GB/500GB | Active | 2, 6, 10, ... |
| 0 | 3 | Dev0-3 | xx.xxx.xxx. 4 | Spot | 0GB/500GB | Active | 3, 7, 11, ... |

FIG. 11

Group management table 100-4-2 (Included in Cluster configuration 100-4)

| Group ID 100-4-2-1 | Active node ID 100-4-2-2 | Stand-by node ID 100-4-2-3 | Metadata Redundancy 100-4-2-4 | Data Redundancy destination node ID 100-4-2-5 |
|---|---|---|---|---|
| 0 | 0 | 1 | 2 | 1 |
| 1 | 1 | 2 | 2 | 2 |
| 2 | 2 | 3 | 2 | 3 |
| 3 | 3 | 0 | 2 | 0 |

FIG. 12

Volume management table 100-5-1 (included metadata 100-5)

| Volume ID 100-5-1-1 | Volume name 100-5-1-2 | Redundancy Type 100-5-1-3 | Redundancy Node ID 100-5-1-4 | Used Capacity / Total Capacity 100-5-1-5 |
|---|---|---|---|---|
| 0 | Dev-0 | Mirror | 1 | 0GB/100GB |
| : | : | : | : | : |
| : | : | : | : | : |

FIG. 13

CLUSTER REDUNDANCY METHOD WHEN USING LOW RELIABILITY NODES

BACKGROUND

Field

The present disclosure is generally directed to storage systems, and more specifically, to a cluster redundancy method when using low reliability nodes.

Related Art

One of the major use cases of the cloud is as a development environment.

In general, development environments should be as cost-effective as possible. However, Virtual Storage Software Block (VSS Block) requires the use of high-performance and expensive instances to form clusters, which tends to increase costs. In the related art, there is an approach to configure VSS Block clusters using low-cost instances such as spot instances. Spot instance is an instance that can be used at low cost because it is provided from unused virtual machines (VMs) in the public cloud.

In the related art implementations, there is a method to build a storage cluster with two types of nodes with different performance and place volumes based on their functional requirement. In another related art implementation, there is a storage system that build cluster with pairs of active node and stand-by node.

SUMMARY

The related art methods do not consider the cluster topology; therefore, a cluster can be stopped or volumes cannot be accessible when spot instances are shut down. Basically, different storage clusters are used between development environment and production environment. There is a need to choose a storage cluster for the development environment to reduce cost, especially for deploying volumes for development.

Further, there is a need to reduce the storage cluster cost by using spot instances without shutting down or losing access to the volumes. There is also a need to place volumes to appropriate clusters based on their intended use (e.g., development, production, and so on).

Example implementations described herein can create storage clusters to pair on-demand and spot instances, taking into account data redundancy and metadata redundancy, and place volumes based on their intended use.

Aspects of the present disclosure can involve a method of managing storage clusters involving high reliability and low reliability nodes, wherein active and standby pairs are chained across the high reliability and low reliability nodes such that each of the high reliability and low reliability nodes involve volumes of the active and standby pairs, the method including, for receipt of a request for volume creation with a specified volume application, selecting a storage cluster from the storage clusters to create the volume with the specified volume application based on policy of the volume and existence of spot instances in the storage clusters, the selecting involving, for the policy of the volume indicative of a development volume, selecting the storage cluster having one or more spot instances from the storage clusters; and for the policy of the volume indicative of a production volume, selecting the storage cluster having no spot instances from the storage clusters.

Aspects of the present disclosure can involve a computer program storing instructions for managing storage clusters involving high reliability and low reliability nodes, wherein active and standby pairs are chained across the high reliability and low reliability nodes such that each of the high reliability and low reliability nodes involve volumes of the active and standby pairs, the instructions including, for receipt of a request for volume creation with a specified volume application, selecting a storage cluster from the storage clusters to create the volume with the specified volume application based on policy of the volume and existence of spot instances in the storage clusters, the selecting involving, for the policy of the volume indicative of a development volume, selecting the storage cluster having one or more spot instances from the storage clusters; and for the policy of the volume indicative of a production volume, selecting the storage cluster having no spot instances from the storage clusters. The computer program and instructions can be stored on a non-transitory computer readable medium and executed by one or more processors.

Aspects of the present disclosure can involve a system for managing storage clusters involving high reliability and low reliability nodes, wherein active and standby pairs are chained across the high reliability and low reliability nodes such that each of the high reliability and low reliability nodes involve volumes of the active and standby pairs, the system including, for receipt of a request for volume creation with a specified volume application, means for selecting a storage cluster from the storage clusters to create the volume with the specified volume application based on policy of the volume and existence of spot instances in the storage clusters, the means for selecting involving, for the policy of the volume indicative of a development volume, selecting the storage cluster having one or more spot instances from the storage clusters; and for the policy of the volume indicative of a production volume, selecting the storage cluster having no spot instances from the storage clusters.

Aspects of the present disclosure can involve a management server, configured to manage storage clusters involving high reliability and low reliability nodes, wherein active and standby pairs are chained across the high reliability and low reliability nodes such that each of the high reliability and low reliability nodes involve volumes of the active and standby pairs, the management server involving a processor, configured to, for receipt of a request for volume creation with a specified volume application, select a storage cluster from the storage clusters to create the volume with the specified volume application based on policy of the volume and existence of spot instances in the storage clusters, by, for the policy of the volume indicative of a development volume, select the storage cluster having one or more spot instances from the storage clusters; and for the policy of the volume indicative of a production volume, select the storage cluster having no spot instances from the storage clusters.

BRIEF DESCRIPTION OF DRAWINGS

FIG. 4 is a screen image that Storage Management Service displays to Storage Provider for Service Catalogue Setting, in accordance with an example implementation.

FIGS. 6 to 10 illustrates management information for managing information on storage cluster configurations and resources managed by the storage management service, in accordance with an example implementation.

FIGS. 11 to 13 illustrate example management information for managing information on storage cluster configurations and resources managed by the storage cluster, in accordance with an example implementation.

DETAILED DESCRIPTION

Figure 1:
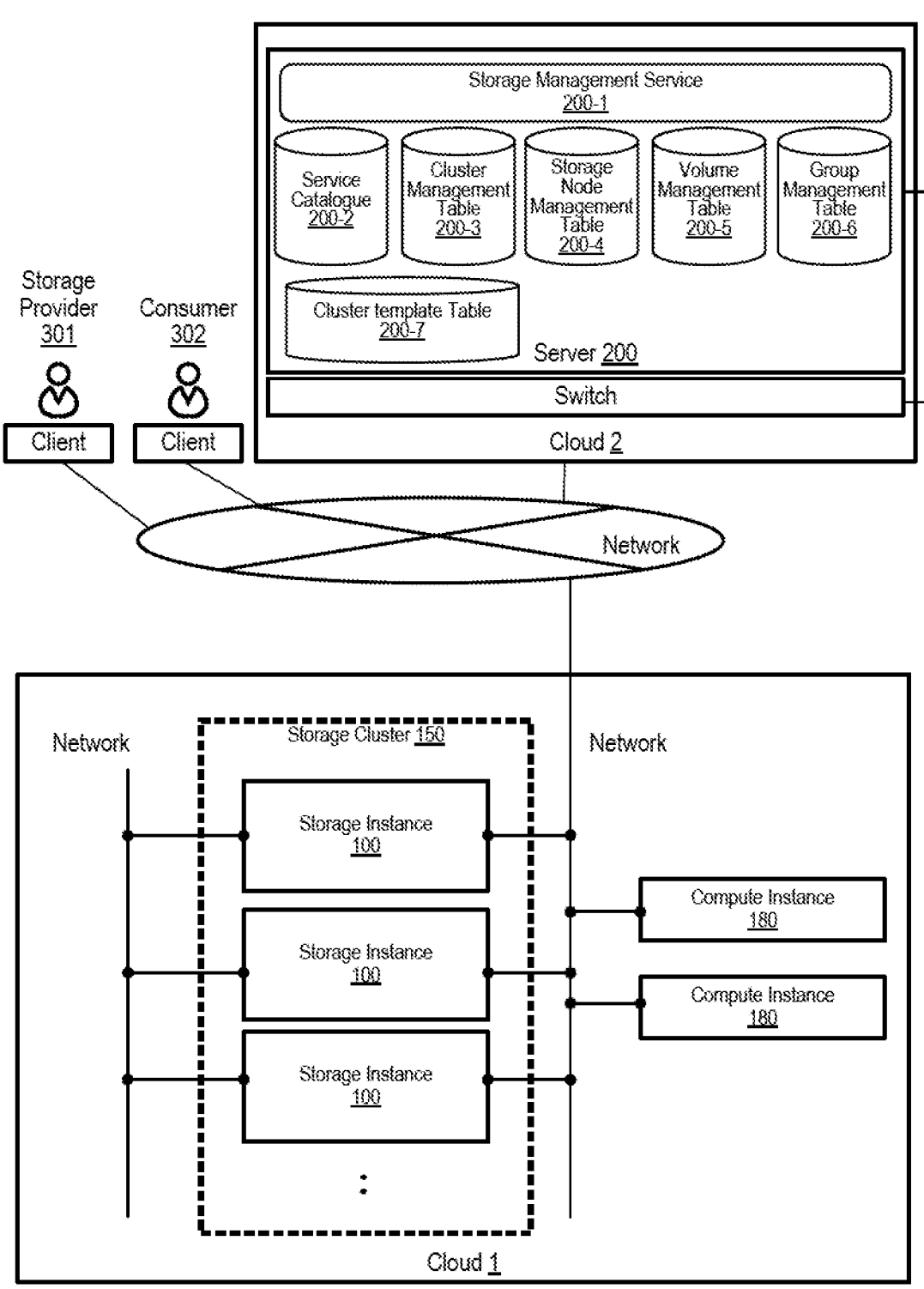
FIG. 1 is a diagram showing the overall system structure, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

FIG. 1 is a diagram that shows the overall system structure, in accordance with an example implementation. The system includes multiple cloud instantiations as shown by Cloud 1 and Cloud 2. Such cloud instantiations are connected to each other via network (e.g. internet). Consumer 302 operates the storage services over network. Provider 301 manages the system for providing storage services.

The storage service application provides storage services for Cloud 1 from server 200, and can include the storage management service 200-1 and the following management information. Service Catalogue 200-2 stores a list of services and their settings provided by Provider 301 to Consumer 302. Cluster management table 200-3 stores a list of clusters in Cloud 1. Storage node management table 200-4 stores a list of storage nodes in storage clusters in Cloud 1. Volume management table 200-5 stores a list of volumes in storage clusters in Cloud 1. Group management table 200-6 stores a list of group of node controller modules in storage instances 100 in Cloud 1.

Each site has computer servers and switches, and Cloud 1 has Storage Instance 100, and Compute Instance 180. These are connected by LAN (Local Area Network) and/or SAN (Storage Area Network). Some virtual machines, containers, and applications run on Compute Instance 180 and their data is stored on Storage Instance 100.

Storage cluster 150 involves a plurality of storage instance 100 which are mutually connected by LAN.

Figure 2:
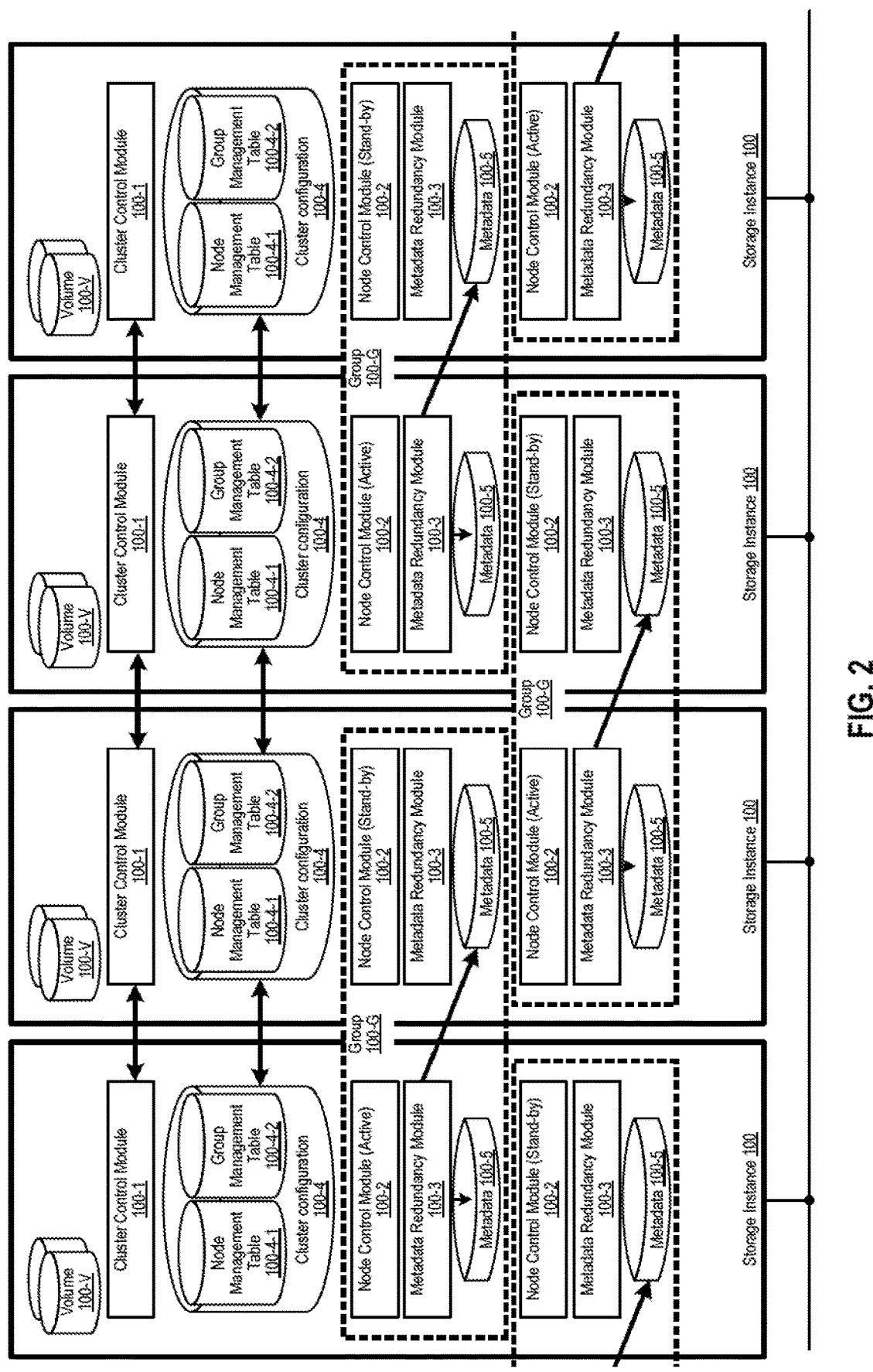
FIG. 2 illustrates the detailed view of the storage cluster and storage instance, in accordance with an example implementation.

FIG. 2 illustrates the detailed view of the storage cluster and storage instance, in accordance with an example implementation. Specifically, FIG. 2 illustrates the detailed view of storage cluster 150 and storage instance 100 in from FIG. 1. Each storage instance 100 has Cluster Control module 100-1, Node control module 100-2, metadata redundancy module 100-3, Volume 100-V, Group 100-G and various management information as follows.

Node management table 100-4-1 stores a list of storage node information in the storage cluster. Group management table 100-4-2 stores a list of group of node controller modules in the storage cluster. Metadata 100-5 stores a list of volume information in the node controller group.

Group 100-G involves one active node control module and one or more standby node control modules. Each node controller is located on a different storage node. Metadata redundancy module 100-3 in the same node of active node control module 100-2 duplicate metadata to the nodes of the stand-by node control module.

Cluster control module 100-1 is located on all nodes of the storage cluster. Cluster control module 100-1 create its cluster and groups, duplicate cluster configuration 100-4 to all the nodes in the cluster.

Figure 3:
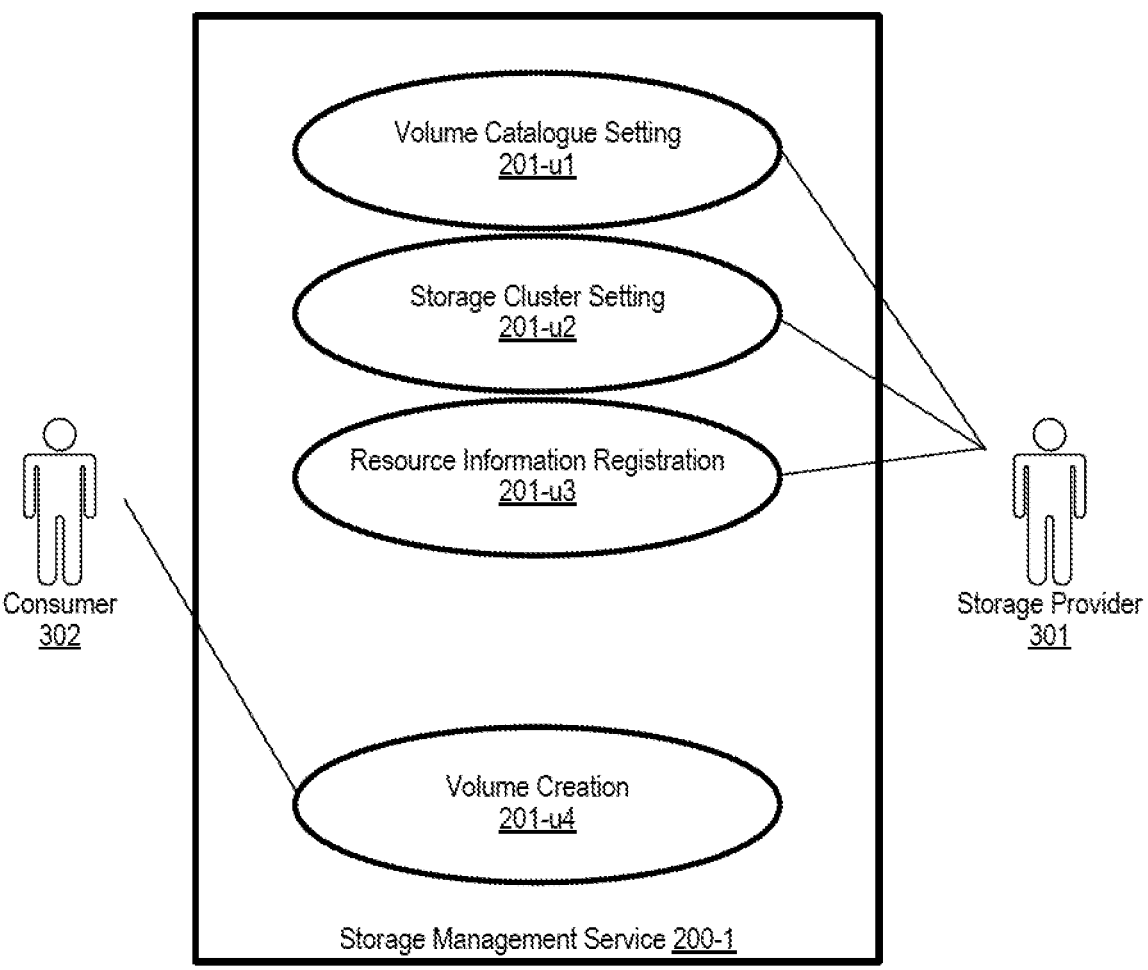
FIG. 3 illustrates an example use case diagram for Storage Management Service, in accordance with an example implementation.

FIG. 3 illustrates an example use case diagram for Storage Management Service 200-1, in accordance with an example implementation. Storage provider 301 performs the following actions.

Service catalogue setting 201-*u*1: Storage provider 301 provides service catalogue settings. Such settings may be reconfigured as system requirements change.

Storage cluster setting 201-*u*2: Storage provider 301 performs cluster creation, configuration and registers clusters to cluster management table.

Resource information registration 201-*u*3: Storage provider 301 registers available capacity, capacity threshold, and so on. This operation can be done by automatic generation from the system configuration, rather than manual input by the provider. Storage provider 301 will change parameters when there is a change in the system.

Storage consumer 302 performs volume creation 201-*u*3, in which the storage consumer 302 creates volumes by inputting volume type, capacity, performance, and so on.

FIG. 4 is a screen image that Storage Management Service 200-1 displays to Storage Provider 301 for Service Catalogue Setting 201-*u*1, in accordance with an example implementation. This screen displays the information stored in 200-2 and accepts edits.

Service Catalogue 200-2 manages the list of storage volume provisioning service tied to the Service Name 200-3-1, and includes unit price 200-3-2, unit capacity 200-3-3, max read throughput 200-3-4, max write throughput 200-3-5, min read throughput 200-3-6, min write throughput 200-3-7, volume use 200-3-8, and volume type 200-3-9.

Service Name 200-3-1 is a unique name in the system. Unit price 200-3-2 indicates the cost that will be incurred when one unit of the service is purchased. Unit capacity 200-3-3 indicates the capacity that will be provided when one unit of the service is purchased. Max read throughput 200-3-4 indicates the maximum read throughput that will be provided when one unit of the service is purchased. Max write throughput 200-3-5 indicates the maximum write throughput that will be provided when one unit of the service is purchased. Min read throughput 200-3-6 indicates the minimum read throughput that will be provided if servers create read requests more than this throughput when one unit of the service is purchased. Min write throughput 200-3-7 indicates the minimum write throughput that will be provided if servers create write requests more than this throughput when one unit of the service is purchased. Volume use 200-3-8 indicates if the volume is a development volume or a production volume. Volume type 200-3-9 indicates if the volume is for performance or capacity.

Figure 5:
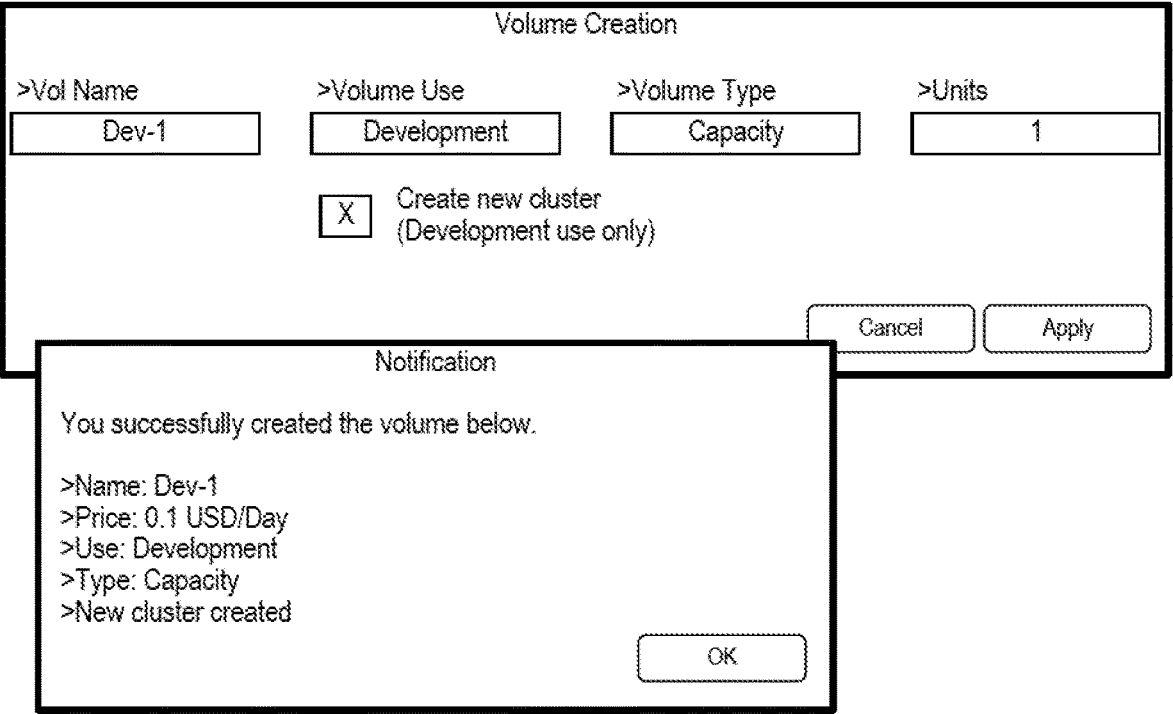
FIG. 5 is the screen image displayed by the Storage Management Service to the Consumer, in accordance with an example implementation.

FIG. 5 illustrates a screen image displayed by the Storage Management Service 200-1 to the Consumer 302 to ask them to enter the settings for the volume to be purchased for Volume Creation 201-*u*4. Consumer 302 names the individual volume, selects a use and a type and from the information provided in the volume catalog, check for a new cluster if needed, and enters the number of units to be set for the storage cluster 150. If the volume is successfully created, the name, total price, the type, and any new clusters created are displayed.

FIGS. 6 to 10 illustrates management information for managing information on storage cluster configurations and resources managed by the storage management service, in accordance with an example implementation. Specifically, FIG. 6 illustrates management information for storage cluster configurations and resources managed by the storage management service. Storage cluster management table 200-3 stores information of the storage clusters, such as Cluster ID 200-3-1, cluster name 200-3-2, the number of on-demand instances 200-3-3, the number of spot instances 200-3-3, metadata redundancy 200-3-5, data redundancy type 200-3-6, data redundancy 200-3-7, the number of data 200-3-8, used capacity and total capacity of its cluster 200-3-9, and cluster address 200-3-10.

Data redundancy 200-3-7 and the number of data 200-3-8 indicate how much data is redundant in the cluster. For example, if a 4-data and 2-parity erasure coding is used, then data redundancy 200-3-7 is 2, and the number of data 200-3-8 is 4. If mirroring is used, then data redundancy 200-3-7 is 2, and the number of data 200-3-8 is N/A.

FIG. 7 illustrates management information for managing information on storage cluster configurations and resources managed by the storage cluster, in accordance with an example implementation. Storage node management table 200-4 stores information of the storage nodes, such as Node ID 200-4-1, node name 200-4-2, node address 200-4-3, the instance type of the node 200-4-4, used capacity and total capacity of its cluster 200-4-5, cluster ID that includes the node 200-4-6, and the status of the node 200-4-7.

FIG. 8 illustrates an example of the volume management table 200-5, in accordance with an example implementation. Volume management table 200-5 stores information of the volumes in the storage clusters. Examples of information managed by volume management table 200-5 includes Cluster ID that includes the volume 200-5-1, volume ID 200-5-2, volume name 200-5-3, volume type 200-5-4, used capacity and total capacity of its cluster 200-5-5, and node ID that includes the volume 200-5-6. Volume ID is unique within the cluster.

FIG. 9 illustrates an example of the group management table 200-6, in accordance with an example implementation. Group management table 200-6 stores information of the groups in the storage clusters. Examples of information managed by the group management table 200-6 includes Cluster ID that includes the group 200-6-1, the group ID 200-6-2, node ID that has active node control module of this group 200-6-3, node IDs that have stand-by node control module of this group 200-6-4, metadata redundancy 200-6-5, and data redundancy destination node IDs 200-6-6. Group ID 200-6-2 is unique within the cluster. Metadata redundancy is the same of the sum of the number of active node ID 200-6-3 and Stand-by node ID 200-6-4.

FIG. 10 illustrates an example of the volume type and storage cluster template table 200-7, in accordance with an example implementation. Volume type and storage cluster template table 200-7 stores information which is needed at creating storage clusters, such as Template ID 200-7-1, acceptable volume type 200-7-2, metadata redundancy 200-7-3, data redundancy type 200-7-4, data redundancy 200-7-5, number of data 200-7-6, and default total number of nodes 200-7-7. Template ID 200-7-1 is unique within the system. Metadata redundancy 200-7-3 is the sum of the number of active node and stand-by node in one group. Data redundancy type 200-7-4, Data redundancy 200-3-7 and the number of data 200-3-8 indicate how much data is redundant in the cluster. For example, if 4-data and 2-parity erasure coding is used, then data redundancy type 200-7-4 is 4D+2P, and the number of data 200-3-8 is 4. If mirroring is used, then data redundancy 200-3-7 is 2, and the number of data 200-3-8 is N/A.

Default total number of nodes 200-7-7 is the total number of nodes of the cluster if storage provider 301 or consumer 302 do not specify the number of nodes of the cluster when they create the cluster.

FIGS. 11 to 13 illustrate example management information for managing information on storage cluster configurations and resources managed by the storage cluster. In FIG. 11, storage node management table 100-4-1 stores information of the storage nodes, such as cluster ID 100-4-1-1, node ID 100-4-1-2, node name 100-4-1-3, node address 100-4-1-4, the instance type of the node 100-4-1-5, used capacity and total capacity of its cluster 100-4-1-6, node status 100-4-1-7, and the volume IDs that are included in this node 100-4-1-8.

In FIG. 12, the group management table 100-4-2 stores information of the groups in the storage cluster, such as group ID 100-4-2-1, node ID that has active node control module of this group 100-4-2-2, node IDs that have stand-by node control module of this group 100-4-2-3, metadata redundancy 100-4-2-4, and data redundancy destination node IDs 100-4-2-5. Group ID 100-4-2-1 is unique within the cluster. Metadata redundancy is the same of the sum of the number of active node ID 100-4-2-2 and Stand-by node ID 100-4-2-3.

In FIG. 13, volume management table 100-5-1 stores information of the volumes in this group, such as volume ID 100-5-1-1, volume name 100-5-1-2, redundancy type 100-5-1-3, data redundancy destination node ID 100-5-1-4, used capacity and total capacity 100-5-1-5. Volume ID 100-5-1-1 is unique within the cluster.

Figure 14:
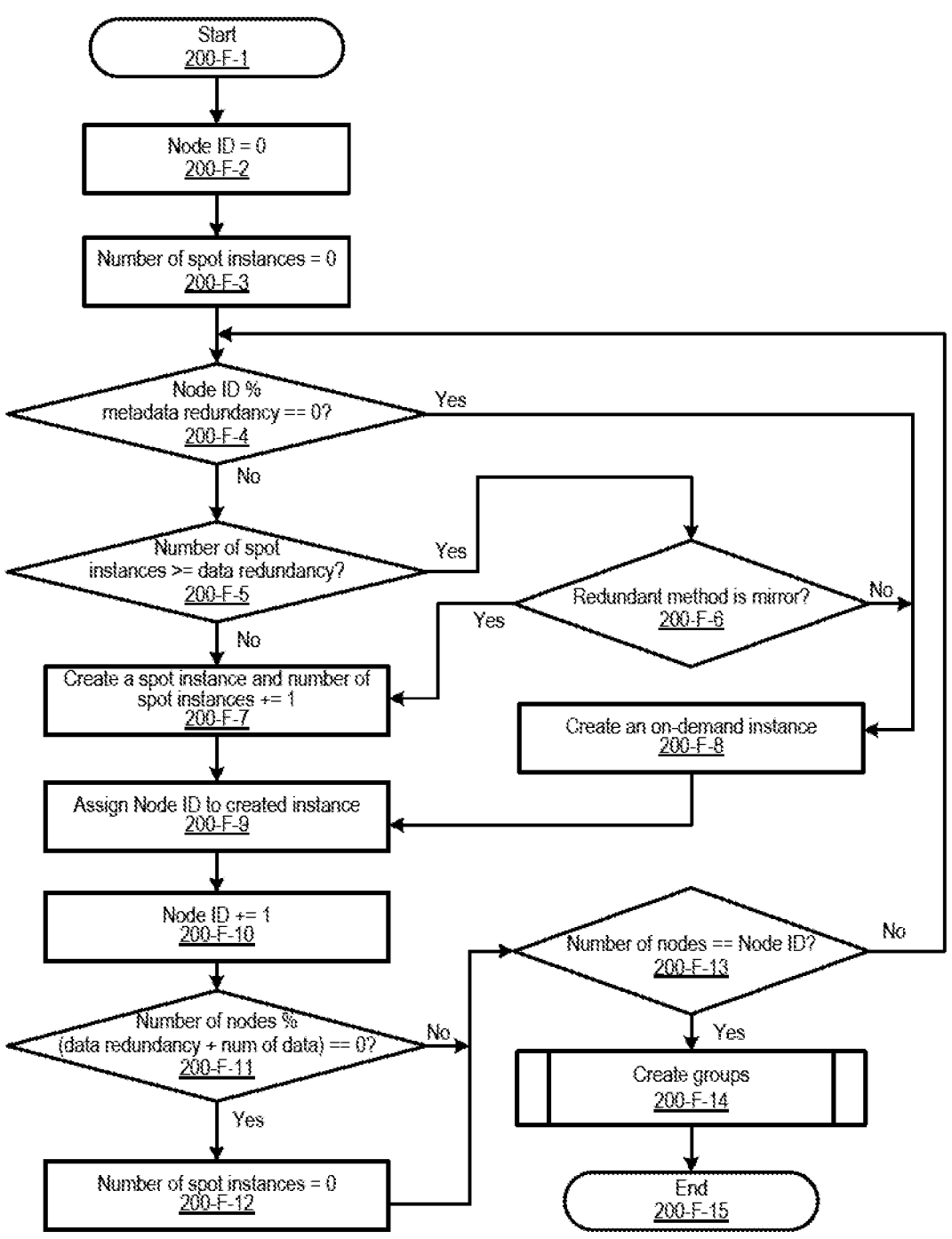
FIGS. 14 and 15 illustrate the processing flow in Storage Management Service when a cluster creation request is issued, in accordance with an example implementation.
Figure 15:
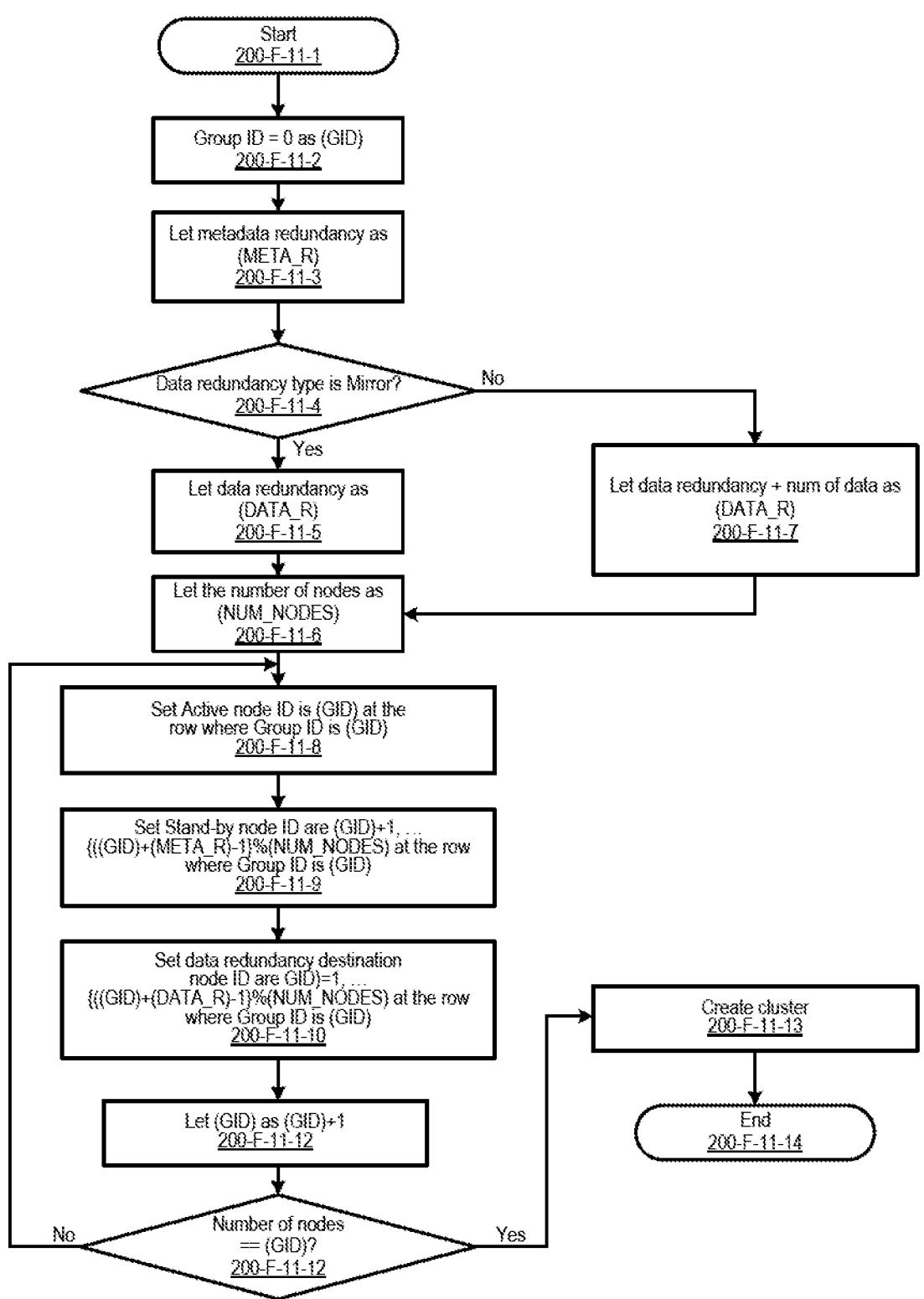

FIGS. 14 and 15 illustrate the processing flow in Storage Management Service 200-1 when a cluster creation request is issued in 201-*u*1, in accordance with an example implementation. At Step 200-F-1, this program is invoked upon receipt of a cluster creation request.

At Step 200-F-2, the flow sets the current Node ID to 0. At Step 200-F-3, the flow sets the current number of spot instances to 0. At Step 200-F-4, the flow checks if the remainder obtained by dividing the current node ID by the metadata redundancy 200-3-5 is 0 or not. If so (Yes), then the flow proceeds to Step 200-F-8, otherwise (No) the flow proceeds to Step 200-F-5.

At Step 200-F-5, the flow checks if the current number of spot instances is larger equal than the data redundancy 200-3-7. If so (Yes), then the flow proceeds to Step 200-F-6, otherwise (No), the flow proceeds to Step 200-F-7.

At Step 200-F-6, the flow checks if the data redundancy type is mirror or not. If so (Yes), then the flow proceeds to Step 200-F-7, otherwise (No) the flow proceeds to Step 200-F-8. The mirror is to have the same number of data copies as the data redundancy type 200-3-7.

At Step 200-F-7, the flow creates a spot instance and updates the current number of spot instances with the current number of spot instances+1. At Step 200-F-8, the flow creates an on-demand instance. At Step 200-F-9, the flow assigns a node ID to the created instance. At Step 200-F-10, the flow updates the current node ID with the current node ID+1. At Step 200-F-11, the flow checks if the remainder obtained by dividing the number of total nodes, which is the sum of the number of on-demand nodes 200-3-3 and the number of spot nodes 200-3-4, by the sum of data redundancy 200-3-7 and num of data 200-3-8 is 0 or not. If so (Yes), then the flow proceeds to Step 200-F-12, otherwise (No) the flow proceeds to Step 200-F-13.

At Step 200-F-12, the flow sets the current Node ID to 0. At Step 200-F-13, the flow checks if the number of total nodes, which is the sum of the number of on-demand nodes 200-3-3 and the number of spot nodes 200-3-4, is the same as the current node ID. If this is true (Yes), then the storage management service created enough number of nodes and proceeds to Step 200-F-14, otherwise (No), the flow proceeds back to Step 200-F-4.

At Step 200-F-14, the flow creates the groups as described by executing the flow of FIG. 15. At Step 200-F-15, the flow ends.

From FIG. 15, the flow creates the groups from Step 200-F-14. At Step 200-F-11-1, this program is invoked upon group creation step in the cluster creation flowchart of FIG. 14. At Step 200-F-11-2, the flow sets current group ID as GID 0. At Step 200-F-11-3, the flow sets cluster metadata redundancy 200-3-5 as META_R. At Step 200-F-11-4 the flow checks if this cluster data redundancy type 200-3-6 is Mirror or not. If so (Yes), then the flow proceeds to 200-F-11-5, otherwise (No) the flow proceeds to Step 200-F-11-7.

At Step 200-F-11-5, the flow sets the cluster data redundancy 200-3-7 as DATA_R. At Step 200-F-11-6, the flow sets the cluster's total number of nodes, the sum of 200-3-4 and 200-3-5, as NUM_NODES. At Step 200-F-11-7, the flow sets the sum of this cluster's data redundancy 200-3-7 and the number of data 200-3-8 as DATA_R.

At Step 200-F-11-8, the flow sets active node ID in the row where group ID is (GID) to (GID). At Step 200-F-11-9, the flow sets stand-by node ID in the row where group ID is (GID) to (GID)+1, . . . {(GID)+(META_R)−1} % (NUM_NODES). {(GID)+(META_R)−1} % (NUM_NODES) is the remainder of the sum of (GID), (META_R) and −1 divided by NUM_NODES.

At Step 200-F-11-10, the flow sets data redundancy destination node ID in the row where group ID is (GID) to (GID)+1, . . . {(GID)+(DATA_R)−1} % (NUM_NODES). {(GID)+(DATA_R)−1} % (NUM_NODES) is the remainder of the sum of (GID), (DATA_R) and −1 divided by NUM_NODES. At Step 200-F-11-11, the flow updates the current (GID) with (GID)+1. At Step 200-F-11-12, the flow checks if the number of nodes is equal to (GID). If so (Yes), then the flow proceeds to Step 200-F-11-13 to create the cluster, otherwise (No), the flow proceeds back to Step 200-F-11-8. At Step 200-F-11-13, the storage management service 200-1 creates the storage cluster. At Step 200-F-11-14, the flow ends.

Figure 16:
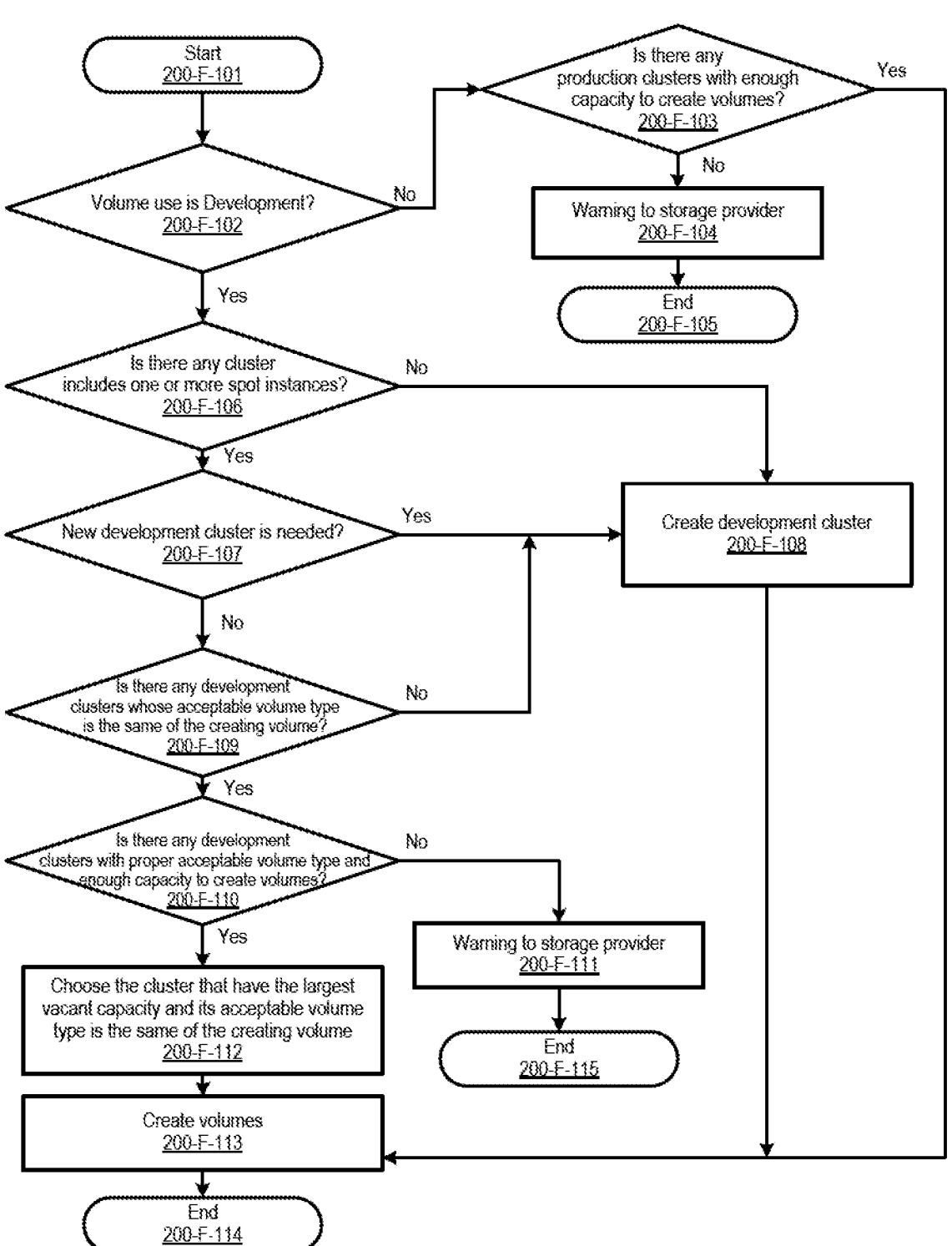
FIG. 16 illustrates an example of the processing flow in Storage Management Service when a volume creation request is issued, in accordance with an example implementation.

FIG. 16 illustrates an example of the processing flow in Storage Management Service 200-1 when a volume creation request is issued in 201-u4, in accordance with an example implementation. At Step 200-F-101, the program is invoked upon volume creation request is issued. At Step 200-F-102, the flow checks if the volume type is development or not. If so (Yes) then the flow proceeds to Step 200-F-106, otherwise (No) the flow proceeds to Step 200-F-103.

At Step 200-F-103, the flow checks if there is at least one production cluster that have enough capacity to create volumes. If so (Yes), then the flow proceeds to Step 200-F-113, otherwise (No) the flow proceeds to Step 200-F-104. At Step 200-F-104 the flow sends a warning to the storage provider because the volume creation request has failed.

At Step 200-F-106, the flow checks if there is at least one development cluster that have one or more spot instances or not. If so (Yes), then the flow proceeds to Step 200-F-107, otherwise (No) the flow proceeds to Step 200-F-108.

At Step 200-F-107, the flow checks if the new development cluster required or not. If so (Yes), then the flow proceeds to Step 200-F-108, otherwise (No), the flow proceeds to Step 200-F-109.

At Step 200-F-108, the flow creates a new development cluster. When creating a new development cluster, storage management service 200-1 uses the same configuration of the development cluster which already has been registered 200-3. If there are some development clusters registered in 200-3, the flow will choose the one that has the largest number of spot instances unless otherwise specified.

At Step 200-F-109, the flow checks if there is at least one development cluster whose acceptable volume type is the same type as the creating volume or not. If so (Yes) then the flow proceeds to Step 200-F-110, otherwise (No) the flow proceeds to Step 200-F-108.

At Step 200-F-110, the flow checks if there at least one development cluster with the proper acceptable volume type and enough capacity to create volumes or not. If so (Yes), then the flow proceeds to Step 200-F-112, otherwise (No) the flow proceeds to Step 200-F-111 to send a warning to the storage provider because the volume creation request has failed.

At Step 200-F-112, the flow chooses the cluster that has the largest vacant capacity and that has an acceptable volume type being the same of the creating volume. At Step 200-F-113, the flow creates volumes on the selected cluster. At Steps 200-F-114 and 200-F-115 the flow ends.

Figure 17:
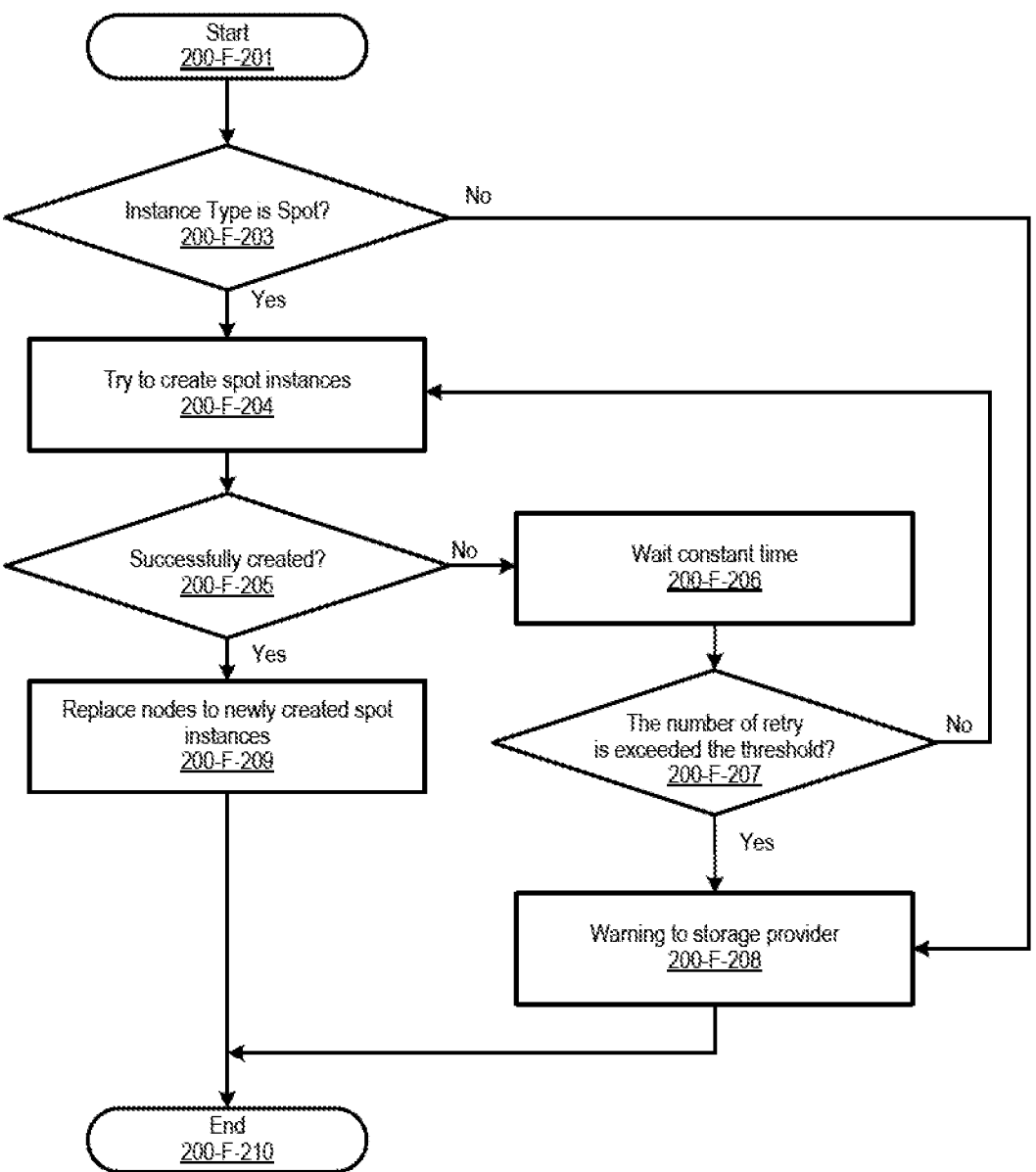
FIG. 17 illustrates an example of the processing flow in Storage Management Service for when a node failure has occurred, in accordance with an example implementation.

FIG. 17 illustrates an example of the processing flow in Storage Management Service 200-1 for when a node failure has occurred in 201-u2, in accordance with an example implementation. At Step 200-F-201, this program is invoked upon the storage management service 200-1 receiving the notice of node failure.

At Step 200-F-203, the flow checks if the failed node type is development or not. If this is not a spot instance (No), there may be some kind of problems such as hardware failure, software failure, and so on. Therefore, the storage management service warns the storage provider 301 only and proceeds to Step 200-F-208. Otherwise (Yes) the flow proceeds to Step 200-F-204.

At Step 200-F-204, the flow tries to create spot instances. At Step 200-F-205, the flow checks if spot instances are successfully created or not. If so (Yes), then the flow proceeds to Step 200-F-209, otherwise (No) the flow proceeds to Step 200-F-206.

At Step 200-F-206, the flow waits a constant time. Spot instances is remaining instances that are cheaper than usual. When spot instances fail, it may be due to the shortage of the remaining instances. Therefore, the flow will wait and retry.

At Step 200-F-207, the flow checks if the number of retries exceeded the threshold. If this is true, there may be other trouble such as hardware failure or software failure than the shortage of remaining instances. If so (Yes), the flow proceeds to Step 200-F-208, otherwise (No) the flow proceeds to Step 200-F-204.

At Step 200-F-208 the flow sends a warning to storage provider 301. At Step 200-F-209, the flow replaces nodes to newly created spot instances. At Step 200-F-210, the flow ends.

Through the example implementations described herein, it is possible to reduce the cost of the development environment.

Figure 18:
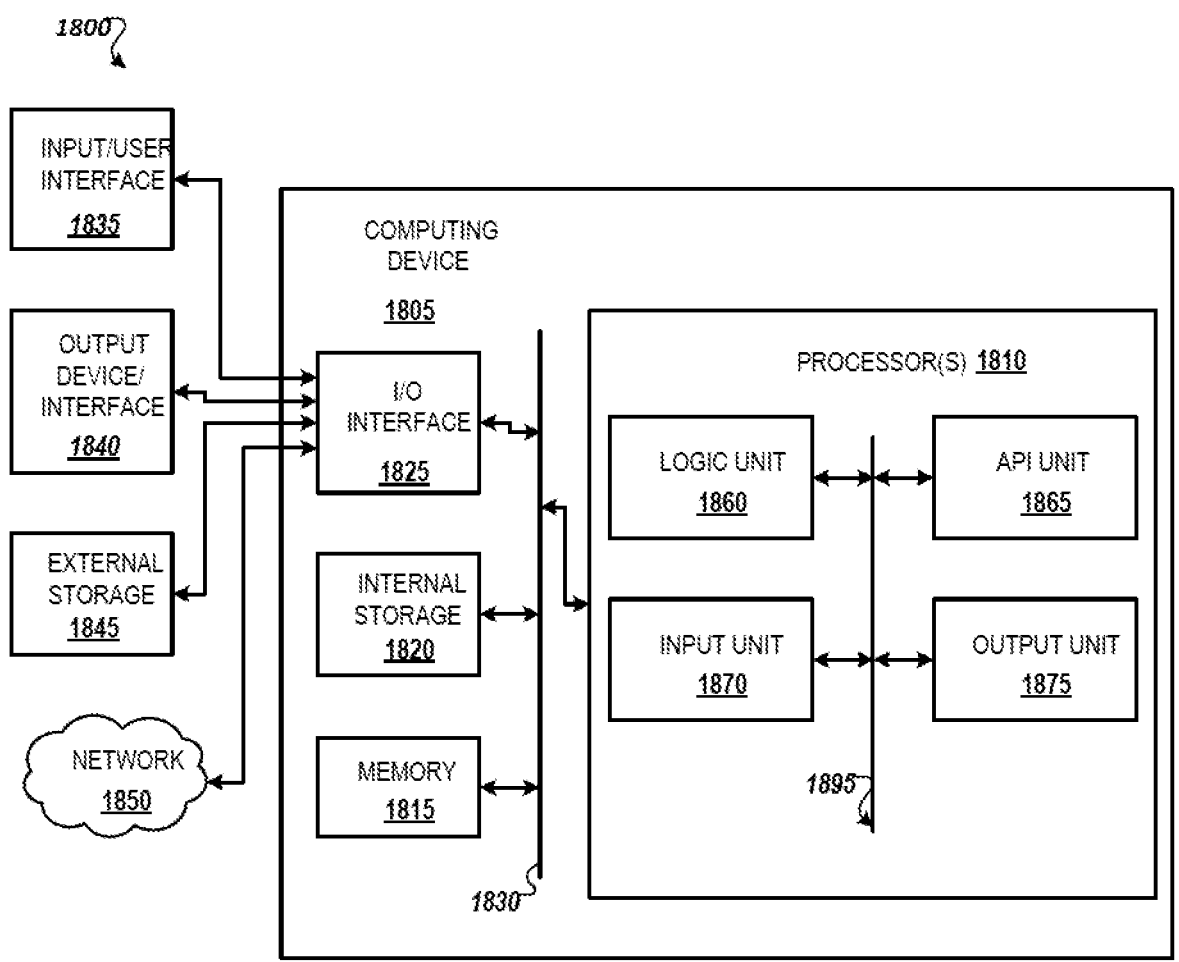
FIG. 18 illustrates an example computing environment with an example computer device suitable for use in some example implementations.

FIG. 18 illustrates an example computing environment with an example computer device suitable for use in some example implementations, such as server 200. Computer device 1805 in computing environment 1800 can include one or more processing units, cores, or processors 1810, memory 1815 (e.g., RAM, ROM, and/or the like), internal storage 1820 (e.g., magnetic, optical, solid-state storage, and/or organic), and/or IO interface 1825, any of which can be coupled on a communication mechanism or bus 1830 for communicating information or embedded in the computer device 1805. IO interface 1825 is also configured to receive images from cameras or provide images to projectors or displays, depending on the desired implementation.

Computer device 1805 can be communicatively coupled to input/user interface 1835 and output device/interface 1840. Either one or both of the input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1840 may include a display, television, monitor, printer, speaker, braille, or the like. In some example implementations, input/user interface 1835 and output device/interface 1840 can be embedded with or physically coupled to the computer device 1805. In other example implementations, other computer devices may function as or provide the functions of input/user interface 1835 and output device/interface 1840 for a computer device 1805.

Examples of computer device 1805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1805 can be communicatively coupled (e.g., via IO interface 1825) to external storage 1845 and network 1850 for communicating with any number of networked components, devices, and systems, including one or more computer devices of the same or different configuration. Computer device 1805 or any connected computer device can be functioning as, providing services of, or referred to as a server, client, thin server, general machine, special-purpose machine, or another label.

IO interface 1825 can include but is not limited to, wired and/or wireless interfaces using any communication or IO protocols or standards (e.g., Ethernet, 802.11x, Universal System Bus, WiMAX, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the like).

Computer device 1805 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1805 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1810 can execute under any operating system (OS) (not shown), in a native or virtual environment. One or more applications can be deployed that include logic unit 1860, application programming interface (API) unit 1865, input unit 1870, output unit 1875, and inter-unit communication mechanism 1895 for the different units to communicate with each other, with the OS, and with other applications (not shown). The described units and elements can be varied in design, function, configuration, or implementation and are not limited to the descriptions provided. Processor(s) 1810 can be in the form of hardware processors such as central processing units (CPUs) or in a combination of hardware and software units.

In some example implementations, when information or an execution instruction is received by API unit 1865, it may be communicated to one or more other units (e.g., logic unit 1860, input unit 1870, output unit 1875). In some instances, logic unit 1860 may be configured to control the information flow among the units and direct the services provided by API unit 1865, the input unit 1870, the output unit 1875, in some example implementations described above. For example, the flow of one or more processes or implementations may be controlled by logic unit 1860 alone or in conjunction with API unit 1865. The input unit 1870 may be configured to obtain input for the calculations described in the example implementations, and the output unit 1875 may be configured to provide an output based on the calculations described in example implementations.

Processor(s) 1810 can be configured to execute a method or instructions for managing storage clusters involving high reliability and low reliability nodes, wherein active and standby pairs are chained across the high reliability and low reliability nodes such that each of the high reliability and low reliability nodes involve volumes of the active and standby pairs, which can include, for receipt of a request for volume creation with a specified volume application, selecting a storage cluster from the storage clusters to create the volume with the specified volume application based on policy of the volume and existence of spot instances in the storage clusters, the selecting involving, for the policy of the volume indicative of a development volume, selecting the storage cluster having one or more spot instances from the storage clusters; and for the policy of the volume indicative of a production volume, selecting the storage cluster having no spot instances from the storage clusters as illustrated in the flow of FIG. 14.

Processor(s) 1810 can be configured to execute the method or instructions as described above, and further involve, for no storage cluster being available based on the policy of the volume, creating a new cluster as illustrated in FIG. 16.

Processor(s) 1810 can be configured to execute the method or instructions as described above, and further involve, for multiple storage clusters with one or more spot instances being selectable for a development volume, selecting a volume based on a volume criteria. Such a volume criteria can involve, but is not limited to, the largest vacant capacity, or other criteria in accordance with the desired implementation.

Processor(s) 1810 can be configured to execute the method or instructions as described above, and further involve, for an occurrence of a node failure and for a type of a node associated with the node failure being a spot instance, creating a new spot instance; for the new spot instance creation being successful, replacing the node associated with the node failure with the created spot instance; and for the new spot instance creation not being successful, waiting a constant time until retrying creation of the new spot instance while a number of retries is below a threshold as illustrated in FIG. 17.

Processor(s) 1810 can be configured to execute the method or instructions as described above, and further involve, for the policy of the volume indicative of a development volume, determining whether the storage cluster having one or more spot instances from the storage clusters have sufficient capacity to meet the request for volume creation; and for the capacity determined to be insufficient, generating a warning to a storage provider associated with the request for volume creation as illustrated, for example, at the flow of 200-F-110 as illustrated in FIG. 16.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method of managing storage clusters involving high reliability and low reliability nodes, wherein active and standby pairs are chained across the high reliability and low reliability nodes such that each of the high reliability and low reliability nodes involve volumes of the active and standby pairs, the method comprising:

for receipt of a request for volume creation with a specified volume application:

selecting a storage cluster from the storage clusters for volume creation with the specified volume application based on volume policy and existence of spot instances in the storage clusters creating the volume; wherein the selecting comprises:

for the policy of the volume indicative of a development volume, selecting the storage cluster having one or more spot instances from the storage clusters; and for the policy of the volume indicative of a production volume, selecting the storage cluster having no spot instances from the storage clusters.

2. The method of claim 1, further comprising, for no storage cluster being available based on the policy of the volume, creating a new cluster.

3. The method of claim 1, wherein for multiple storage clusters with the one or more spot instances being selectable for the development volume, selecting a volume based on a volume criteria.

4. The method of claim 1, further comprising for an occurrence of a node failure and for a type of a node associated with the node failure being a spot instance:

creating a new spot instance;

for the new spot instance creation being successful, replacing the node associated with the node failure with the created spot instance; and for the new spot instance creation not being successful, waiting a constant time until retrying creation of the new spot instance while a number of retries is below a threshold.

5. The method of claim 1, further comprising, for the policy of the volume indicative of the development volume, determining whether the storage cluster having one or more spot instances from the storage clusters have sufficient capacity to meet the request for the volume creation; and for the capacity determined to be insufficient, generating a warning to a storage provider associated with the request for the volume creation.

6. A non-transitory computer readable medium, storing instructions for executing a process for managing storage clusters involving high reliability and low reliability nodes, wherein active and standby pairs are chained across the high reliability and low reliability nodes such that each of the high reliability and low reliability nodes involve volumes of the active and standby pairs, the instructions comprising:

for receipt of a request for volume creation with a specified volume application:

selecting a storage cluster from the storage clusters for volume creation with the specified volume application based on volume policy and existence of spot instances in the storage clusters creating the volume; wherein the selecting comprises:

for the policy of the volume indicative of a development volume, selecting the storage cluster having one or more spot instances from the storage clusters; and for the policy of the volume indicative of a production volume, selecting the storage cluster having no spot instances from the storage clusters.

7. The non-transitory computer readable medium of claim 6, wherein the instructions further comprising, for no storage cluster being available based on the policy of the volume, creating a new cluster.

8. The non-transitory computer readable medium of claim 6, wherein for multiple storage clusters with the one or more spot instances being selectable for the development volume, selecting a volume based on a volume criteria.

9. The non-transitory computer readable medium of claim 6, further comprising for an occurrence of a node failure and for a type of a node associated with the node failure being a spot instance:

creating a new spot instance;

for the new spot instance creation being successful, replacing the node associated with the node failure with the created spot instance; and for the new spot instance creation not being successful, waiting a constant time until retrying creation of the new spot instance while a number of retries is below a threshold.

10. The non-transitory computer readable medium of claim 6, further comprising, for the policy of the volume indicative of the development volume, determining whether the storage cluster having the one or more spot instances from the storage clusters have sufficient capacity to meet the request for the volume creation; and for the capacity determined to be insufficient, generating a warning to a storage provider associated with the request for the volume creation.

11. A management server, configured to manage storage clusters involving high reliability and low reliability nodes, wherein active and standby pairs are chained across the high reliability and low reliability nodes such that each of the high reliability and low reliability nodes involve volumes of the active and standby pairs, the management server comprising:

a processor, configured to:

for receipt of a request for volume creation with a specified volume application:

select a storage cluster from the storage clusters for volume creation with the specified volume application based on volume policy and existence of spot instances in the storage clusters creating the volume, by:

for the policy of the volume indicative of a development volume, select the storage cluster having one or more spot instances from the storage clusters; and for the policy of the volume indicative of a production volume, select the storage cluster having no spot instances from the storage clusters.

12. The management server of claim 11, wherein the processor is further configured to, for no storage cluster being available based on the policy of the volume, create a new cluster.

13. The management server of claim 11, wherein the processor is further configured to, for multiple storage clusters with the one or more spot instances being selectable for the development volume, select a volume based on a volume criteria.

14. The management server of claim 11, wherein the processor is further configured to, for an occurrence of a node failure and for a type of a node associated with the node failure being a spot instance:

create a new spot instance;

for the new spot instance creation being successful, replace the node associated with the node failure with the created spot instance; and for the new spot instance creation not being successful, wait a constant time until retry creation of the new spot instance while a number of retries is below a threshold.

15. The management server of claim 11, wherein the processor is further configured to, for the policy of the volume indicative of the development volume, determine whether the storage cluster having the one or more spot instances from the storage clusters have sufficient capacity to meet the request for the volume creation; and for the capacity determined to be insufficient, generate a warning to a storage provider associated with the request for the volume creation.

* * * * *